(12) United States Patent
Bunker (10) Patent No.: US 9,249,670 B2
(45) Date of Patent: Feb. 2, 2016

(54) COMPONENTS WITH MICROCHANNEL COOLING

(75) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 996 days.

(21) Appl. No.: 13/326,540

(22) Filed: Dec. 15, 2011

(65) Prior Publication Data

US 2013/0156600 A1   Jun. 20, 2013

(51) Int. Cl.
*F01D 5/18* (2006.01)
*F01D 5/20* (2006.01)
*F01D 5/28* (2006.01)

(52) U.S. Cl.
CPC .................. *F01D 5/186* (2013.01); *F01D 5/20* (2013.01); *F01D 5/288* (2013.01); *Y02T 50/672* (2013.01); *Y02T 50/673* (2013.01); *Y02T 50/676* (2013.01)

(58) Field of Classification Search
CPC ......... F01D 5/147; F01D 5/181; F01D 5/182; F01D 5/186; F01D 5/20; F01D 5/288; F01D 25/005; F01D 25/007; F05D 2240/307; F05D 2250/294

See application file for complete search history.

(56) References Cited

U.S. PATENT DOCUMENTS

| | | | |
|---|---|---|---|
| 4,142,824 A * | 3/1979 | Andersen | 415/115 |
| 4,487,550 A | 12/1984 | Horvath et al. | |
| 4,705,455 A * | 11/1987 | Sahm et al. | 416/97 R |
| 4,893,987 A | 1/1990 | Lee et al. | |
| 5,564,902 A | 10/1996 | Tomita | |
| 5,626,462 A | 5/1997 | Jackson et al. | |
| 5,640,767 A | 6/1997 | Jackson et al. | |
| 5,660,523 A | 8/1997 | Lee | |
| 5,875,549 A | 3/1999 | McKinley | |
| 6,059,530 A | 5/2000 | Lee | |

(Continued)

FOREIGN PATENT DOCUMENTS

| | | |
|---|---|---|
| CN | 1467366 A | 1/2004 |
| CN | 1721659 A | 1/2006 |

(Continued)

OTHER PUBLICATIONS

D.G. Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Edward Look
*Assistant Examiner* — Jeffrey A Brownson
(74) *Attorney, Agent, or Firm* — Ann M. Agosti (57) ABSTRACT

A component includes a substrate having an outer surface, an inner surface and a tip. The inner surface defines at least one hollow, interior space. The outer surface defines one or more grooves, where each groove extends at least partially along the outer surface of the substrate and has a base. The component further includes a coating disposed over at least a portion of the outer surface of the substrate. The coating includes at least a structural coating that extends over the groove(s), such that the groove(s) and the structural coating together define one or more channels for cooling the component. The tip comprises a tip cap enclosing the hollow, interior space(s), and a tip rim disposed at a radially outer end of the substrate. The tip rim at least partially defines at least one discharge channel in fluid communication with at least one cooling channel.

31 Claims, 7 Drawing Sheets

(56) References Cited

U.S. PATENT DOCUMENTS

| | | | |
|---|---|---|---|
| 6,086,328 A | | 7/2000 | Lee |
| 6,164,914 A | * | 12/2000 | Correia et al. ............... 416/97 R |
| 6,190,129 B1 | | 2/2001 | Mayer et al. |
| 6,214,248 B1 | | 4/2001 | Browning et al. |
| 6,231,307 B1 | | 5/2001 | Correia |
| 6,234,755 B1 | | 5/2001 | Bunker et al. |
| 6,321,449 B2 | | 11/2001 | Zhao et al. |
| 6,368,060 B1 | | 4/2002 | Fehrenbach et al. |
| 6,383,602 B1 | | 5/2002 | Fric et al. |
| 6,405,435 B1 | | 6/2002 | Konter et al. |
| 6,412,541 B2 | | 7/2002 | Roesler et al. |
| 6,427,327 B1 | | 8/2002 | Bunker |
| 6,551,061 B2 | | 4/2003 | Darolia et al. |
| 6,582,194 B1 | | 6/2003 | Birkner et al. |
| 6,602,053 B2 | | 8/2003 | Subramanian et al. |
| 6,617,003 B1 | | 9/2003 | Lee et al. |
| 6,749,396 B2 | | 6/2004 | Barry et al. |
| 6,905,302 B2 | | 6/2005 | Lee et al. |
| 6,921,014 B2 | | 7/2005 | Hasz et al. |
| 7,014,923 B2 | | 3/2006 | Schnell et al. |
| 7,094,475 B2 | | 8/2006 | Schnell et al. |
| 7,168,921 B2 | | 1/2007 | Honkomp et al. |
| 7,186,084 B2 | | 3/2007 | Bunker et al. |
| 7,186,167 B2 | | 3/2007 | Joslin |
| 7,216,428 B2 | | 5/2007 | Memmen et al. |
| 7,273,347 B2 | | 9/2007 | Rathmann |
| 7,302,990 B2 | | 12/2007 | Bunker et al. |
| 7,322,795 B2 | | 1/2008 | Luczak et al. |
| 7,744,348 B2 | | 6/2010 | Bezencon et al. |
| 7,766,617 B1 | | 8/2010 | Liang |
| 7,775,768 B2 | | 8/2010 | Devore et al. |
| 8,387,245 B2 | | 3/2013 | Bunker et al. |
| 8,512,003 B2 | * | 8/2013 | Klasing et al. ................ 416/228 |
| 8,607,455 B2 | | 12/2013 | Ahmad |
| 8,857,055 B2 | | 10/2014 | Wei et al. |
| 8,905,713 B2 | | 12/2014 | Bunker et al. |
| 2002/0141868 A1 | | 10/2002 | Lee et al. |
| 2002/0141869 A1 | | 10/2002 | Lee et al. |
| 2002/0182074 A1 | | 12/2002 | Bunker |
| 2002/0197160 A1 | | 12/2002 | Liang |
| 2003/0118444 A1 | | 6/2003 | Lee et al. |
| 2004/0096328 A1 | | 5/2004 | Soechting et al. |
| 2005/0013926 A1 | | 1/2005 | Rutkowski et al. |
| 2006/0153680 A1 | | 7/2006 | Liang |
| 2008/0138529 A1 | | 6/2008 | Weaver et al. |
| 2010/0080688 A1 | * | 4/2010 | Bezencon et al. ............ 415/115 |
| 2013/0043009 A1 | | 2/2013 | Bunker et al. |

FOREIGN PATENT DOCUMENTS

| | | |
|---|---|---|
| CN | 1776199 A | 5/2006 |
| CN | 1950589 A | 4/2007 |
| CN | 101008327 A | 8/2007 |
| CN | 101663465 A | 3/2010 |
| EP | 1387040 B1 | 4/2004 |

OTHER PUBLICATIONS

B. Wei et al., "Curved Electrode and Electrochemical Machining Method and Assembly Employing the Same," U.S. Appl. No. 12/562,528, filed Sep. 18, 2009.

W. Zhang et al., Process and System for Forming Shaped Air Holes, U.S. Appl. No. 12/697,005, filed Jan. 29, 2010.

B.P. Lacy et al., "Hot Gas Path Component Cooling System," U.S. Appl. No. 12/765,372, filed Apr. 22, 2010.

B. Lacy et a., "Articles Which Include Chevron Film Cooling Holes, and Related Processes," U.S. Appl. No. 12/790,675, filed May 28, 2010.

J.E.J. Lambie et al., "An overview on micro-meso manufacturing techniques for micro-heat exchangers for turbine blade cooling," International Journal Manufacturing Research, vol. 3, No. 1, 2008, pp. 3-26.

R.S. Bunker et al., "Components With Re-Entrant Shaped Cooling Channels and Methods of Manufacture," U.S. Appl. No. 12/943,624, filed Nov. 10, 2010.

R.S. Bunker et al., "Component and Methods of Fabricating and Coating a Component," U.S. Appl. No. 12/943,646, filed Nov. 10, 2010.

R.S.Bunker et al., "Method of Fabricating a Component Using a Fugitive Coating," U.S. Appl. No. 12/943,563, filed Nov. 10, 2010.

R.S. Bunker et al., "Components With Cooling Channels and Methods of Manufacture," U.S. Appl. No. 12/965,083, filed Dec. 10, 2010.

R. S. Bunker et al., "Method of Fabricating a Component Using a Two-Layer Structural Coating," U.S. Appl. No. 12/996,101, filed Dec. 13, 2010.

R.S. Bunker et al., "Turbine Components With Cooling Features and Methods of Manufacturing the Same," U.S. Appl. No. 12/953,177, filed Nov. 23, 2010.

R.S. Bunker, "Components With Cooling Channels and Methods of Manufacture," U.S. Appl. No. 13/026,595, filed Feb. 14, 2011.

R. Rebak et al., "Methods of Fabricating a Coated Component Using Multiple Types of Fillers," U.S. Appl. No. 13/083,701, filed Apr. 11, 2011.

R. Bunker et al., "Components With Cooling Channels Formed in Coating and Methods of Manufacture", U.S. Appl. No. 13/052,415, filed Mar. 21, 2011.

R.B. Rebak et al., "Component and Methods of Fabricating a Coated Component Using Multiple Types of Fillers," U.S. Appl. No. 13/095,129, filed Apr. 27, 2011.

R. Bunker, "Components With Cooling Channels and Methods of Manufacture", U.S. Appl. No. 13/168,144, filed Jun. 24, 2011.

R.Bunker et al., "Components With Cooling Channels and Method of Manufacture", U.S. Appl. No. 13/210,697, filed Aug. 16, 2011.

R. Bunker, Repair Methods for Cooled Components, U.S. Appl. No. 13/267,617, filed Oct. 6, 2011.

R. Bunker et al., Components With Laser Cladding and Methods of Manufacture, U.S. Appl. No. 13/278,816, filed Oct. 21, 2011.

Unofficial English Translation of Chinese Office Action issued in connection with corresponding CN Application No. 201210541216.X on Mar. 30, 2015.

* cited by examiner

COMPONENTS WITH MICROCHANNEL COOLING

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively low heat transfer rates and non-uniform component temperature profiles.

In particular, turbine blade tip burnout is a prevalent problem in the gas turbine industry. It would therefore be desirable to provide improved tip cooling that would make blade tips durable enough to survive their high temperature operating environments, while still providing an aerodynamic sealing function and rub protection.

BRIEF DESCRIPTION

One aspect of the present invention resides in a component that includes a substrate having an outer surface, an inner surface and a tip. The inner surface defines at least one hollow, interior space. The outer surface defines one or more grooves, where each groove extends at least partially along the outer surface of the substrate and has a base. The component further includes a coating disposed over at least a portion of the outer surface of the substrate. The coating includes at least a structural coating that extends over the groove(s), such that the groove(s) and the structural coating together define one or more channels for cooling the component. The tip includes a tip cap enclosing the hollow, interior space(s), and a tip rim disposed at a radially outer end of the substrate, where the tip rim at least partially defines at least one discharge channel that is in fluid communication with at least one cooling channel.

Another aspect of the invention resides in a component that includes a substrate having an outer surface, an inner surface and a tip. The inner surface defines at least one hollow, interior space, and the tip includes a tip cap enclosing the hollow, interior space(s). The outer surface defines one or more grooves, and each groove extends at least partially along an outer surface of the tip cap and has a base. The component further includes a coating disposed over at least a portion of the outer surface of the substrate. The coating includes at least a structural coating that extends over the groove(s), such that the groove(s) and the structural coating together define one or more channels for cooling the component. The tip comprises a tip cap enclosing the hollow, interior space(s), and the cooling channel(s) extend at least partially along the tip cap.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
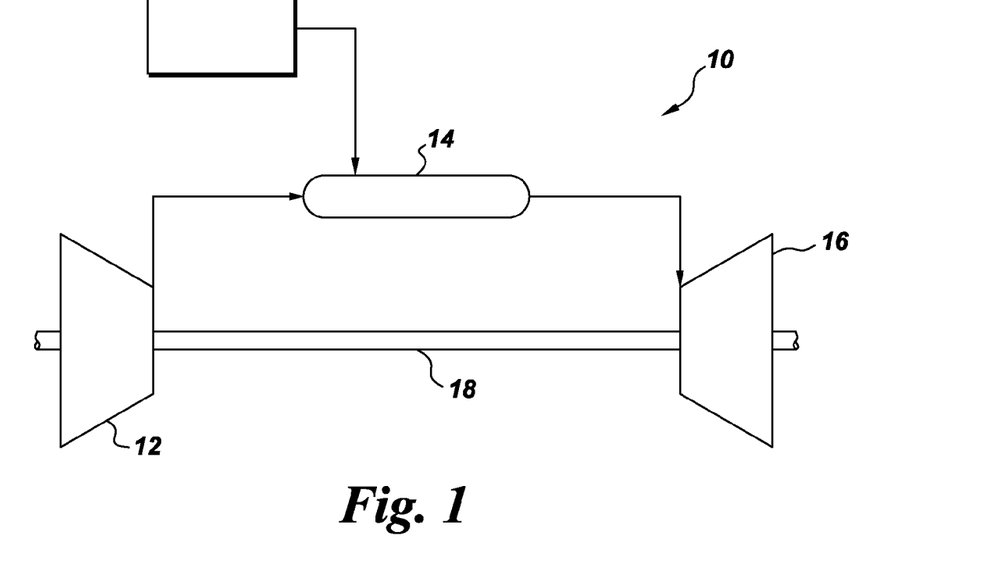
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, increasing the efficiency, performance and/or life of the system 10, a cooling system for the hot gas path component 100 is required.

Micro-channel cooling has the potential to significantly reduce cooling requirements by placing the cooling as close as possible to the heated region, thus reducing the temperature difference between the hot side and cold side of the main load bearing substrate material for a given heat transfer rate.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. The hot gas path component may be provided with a protective coating. A cooling fluid may be provided to the channels from a plenum, and the cooling fluid may flow through the channels, cooling the hot gas path component.

A component 100 is described with reference to FIGS. 2-6, and 11. As indicated, for example, in FIGS. 2 and 3, the component 100 includes a substrate 110 having an outer surface 112, an inner surface 116 and a tip 34. As indicated for example in FIG. 2, the inner surface 116 defines at least one hollow, interior space 114. As indicated, for example in FIGS. 2 and 6, the outer surface 112 defines one or more grooves 132, where each groove 132 extends at least partially along the outer surface 112 of the substrate 110 and has a base 134. 2. For the configuration shown in FIG. 3, the component 100 comprises a turbine airfoil 100, and each hollow, interior space 114 comprises a respective segment of at least one flow channel (which is also indicated by reference numeral 114).

Typically, the substrate 110 is cast prior to forming the groove(s) 132. As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

The grooves 132 may be formed using a variety of techniques. Example techniques for forming the groove(s) 132 include abrasive liquid jet, plunge electrochemical machining (ECM), electric discharge machining (EDM) with a spinning electrode (miffing EDM), and laser machining Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

For particular processes, the grooves are formed using an abrasive liquid jet (not shown). Example water jet drilling processes and systems are disclosed in commonly assigned U.S. patent application Ser. No. 12/790,675, "Articles which include chevron film cooling holes, and related processes," filed May 28, 2010, which is incorporated by reference herein in its entirety. As explained in U.S. patent application Ser. No. 12/790,675, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths, with control of the shaping. For example, this allows the interior access holes 140 (described below with reference to FIG. 4) feeding the channel to be drilled either as a straight hole of constant cross section, a shaped hole (elliptical etc.), or a converging or diverging hole.

In addition, and as explained in U.S. patent application Ser. No. 12/790,675, the water jet system can include a multi-axis computer numerically controlled (CNC) unit (not shown). The CNC systems themselves are known in the art, and described, for example, in U.S. Patent Publication 1005/0013926 (S. Rutkowski et al), which is incorporated herein by reference. CNC systems allow movement of the cutting tool along a number of X, Y, and Z axes, as well as rotational axes.

More particularly, each groove 132 may be formed by directing an abrasive liquid jet at a lateral angle relative to the surface 112 of the substrate 110 in a first pass of the abrasive liquid jet and then making a subsequent pass at an angle substantially opposite to that of the lateral angle, such that each groove narrows at the opening 136 of the groove and thus comprises a re-entrant shaped groove (as discussed below with reference to FIG. 6). Typically, multiple passes will be performed to achieve the desired depth and width for the groove. This technique is described in commonly assigned, U.S. patent application Ser. No. 12/943,624, Bunker et al., "Components with re-entrant shaped cooling channels and methods of manufacture," which is incorporated by reference herein in its entirety. In addition, the step of forming the re-entrant shaped grooves 132 may further comprise performing an additional pass where the abrasive liquid jet is directed toward the base 134 of the groove 132 at one or more angles between the lateral angle and a substantially opposite angle, such that material is removed from the base 134 of the groove 132.

Figure 2:
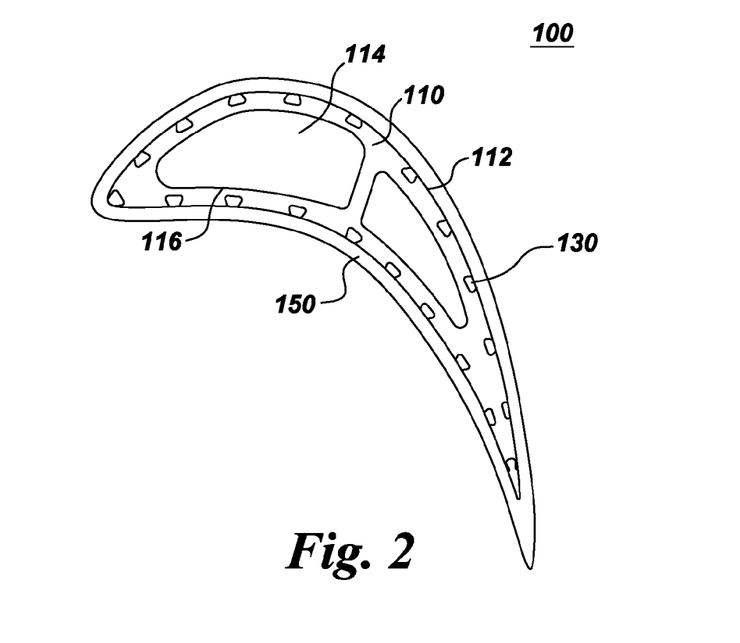
FIG. 2 is a schematic cross-section of an example airfoil configuration with cooling channels, in accordance with aspects of the present invention.
Figure 6:
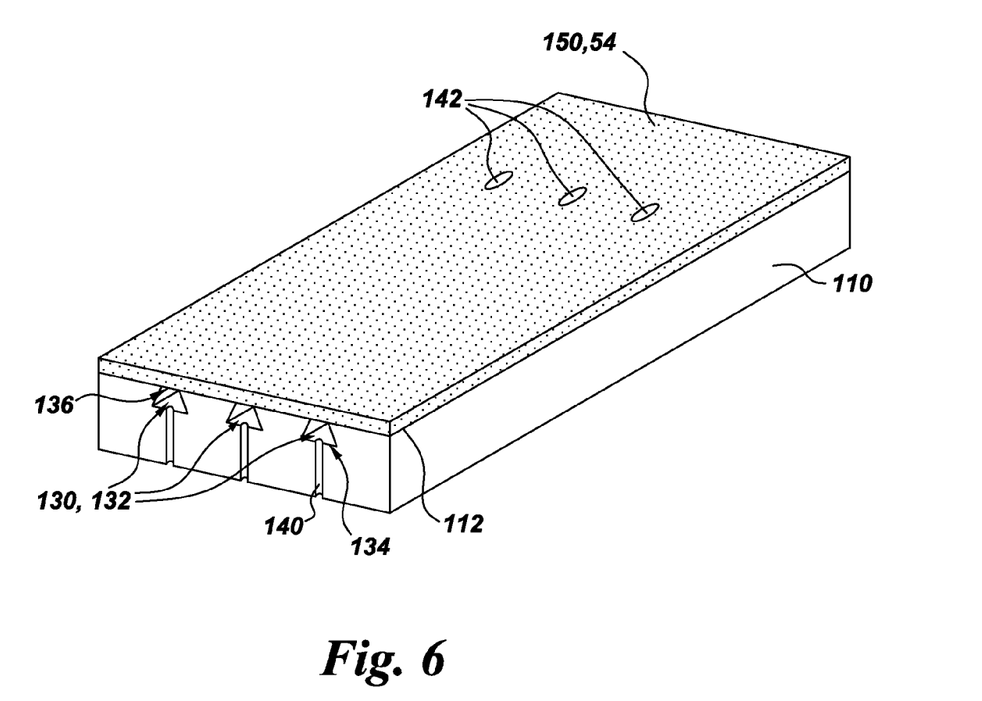
FIG. 6 schematically depicts, in perspective view, three example micro-channels that extend partially along the surface of the substrate and channel coolant to respective film cooling holes.
Figure 11:
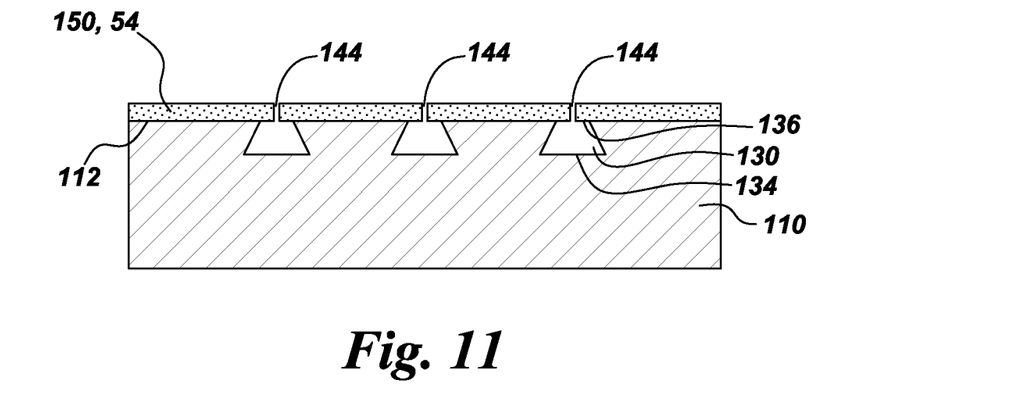
FIG. 11 is a cross-sectional view of three re-entrant shaped channels, where porous slots extend through a structural coating.

Referring now to FIGS. 2, 6 and 11, the component 100 further includes a coating 150 that is disposed over at least a portion of the outer surface 112 of the substrate 110. As indicated, for example in FIG. 6, the coating 150 comprises at least a structural coating 54. Coating 150 comprises a suitable material and is bonded to the component. For the example arrangement shown in FIG. 6, the structural coating 54 extends over the groove(s) 132, such that the groove(s) 132 and the structural coating 54 together define one or more channels 130 for cooling the component 100.

For particular configurations, the coating 150 has a thickness in the range of 0.1-2.0 millimeters, and more particularly, in the range of 0.2 to 1 millimeter, and still more particularly 0.2 to 0.5 millimeters for industrial components. For aviation components, this range is typically 0.1 to 0.25 millimeters. However, other thicknesses may be utilized depending on the requirements for a particular component 100.

The coating 150 comprises structural coating layers and may further include optional additional coating layer(s). The coating layer(s) may be deposited using a variety of techniques. For particular processes, the structural coating layer(s) are deposited by performing an ion plasma deposition (cathodic arc). Example ion plasma deposition apparatus and method are provided in commonly assigned, US Published Patent Application No. 10080138529, Weaver et al, "Method and apparatus for cathodic arc ion plasma deposition," which is incorporated by reference herein in its entirety. Briefly, ion plasma deposition comprises placing a consumable cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No. 5,626,462, Jackson et al., "Double-wall airfoil." For certain hot gas path components 100, the structural coating comprises a nickel-based or cobalt-based alloy, and more particularly comprises a superalloy or a (Ni,Co)CrAlY alloy. For example, where the substrate material is a Ni-base superalloy containing both γ and γ' phases, structural coating may comprise similar compositions of materials, as discussed in greater detail below with reference to U.S. Pat. No. 5,626,462.

For other process configurations, a structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

Figure 4:
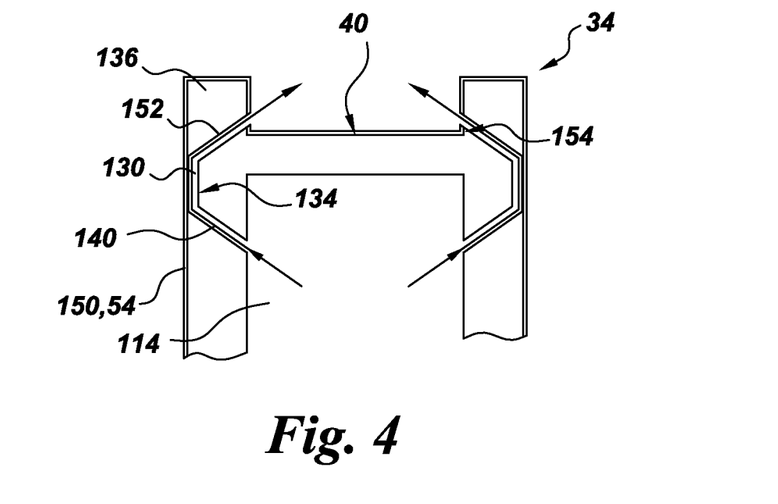
FIG. 4 is an elevational sectional view through the airfoil tip illustrated in FIG. 3 taken along 4-4 showing micro-channels in fluid communication with access and discharge channels.
Figure 5:
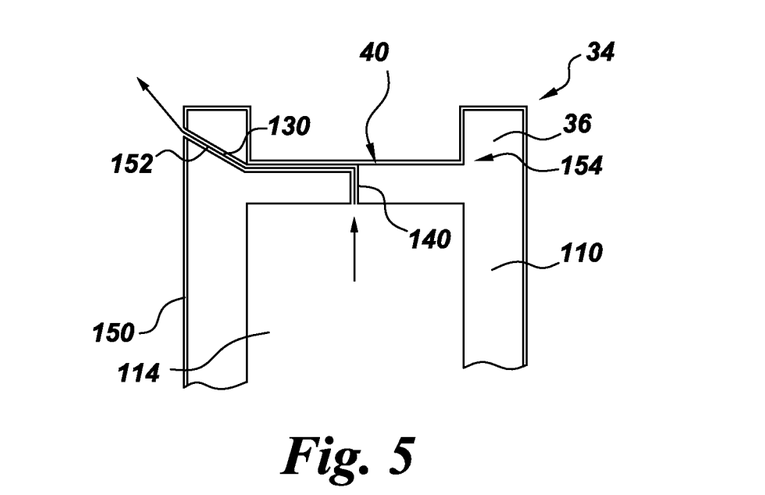
FIG. 5 is an elevational sectional view through an airfoil tip showing a micro-channel extending partially along a tip cap and in fluid communication with respective access and discharge channels.

For the configurations shown in FIGS. 4 and 5, the tip 34 includes a tip cap 40 enclosing the hollow, interior space(s) 114 and a tip rim 36 disposed at a radially outer end 154 of the substrate. As indicated in FIGS. 4 and 5 for example, the tip rim 36 at least partially defines at least one discharge channel 152 that is in fluid communication with at least one cooling channel 130. For example configurations, the diameter of the discharge channels is in the range of about 0.25-1.5 mm, and more particularly, in the range of about 0.35-1 mm. Beneficially, for the arrangements shown in FIGS. 4 and 5, the discharge channels 152 extend through the tip rim 36, thereby cooling the tip rim 36 for improved durability and function.

For the arrangement shown in FIG. 4, the substrate 110 further defines at least one access channel 140 that extends between and provides fluid communication between a respective hollow, interior space 114 and at least one cooling channel 130. As indicated in FIG. 4, the respective access channel 140 intersects the base 134 of the respective cooling channel 130. As noted above, the interior access holes 140 supplying the respective cooling channels may be drilled either as a straight hole of constant cross section, a shaped hole (elliptical etc.), or a converging or diverging hole. Methods for forming the access holes are provided in commonly assigned U.S. patent application Ser. No. 13/210,697, which is incorporated by reference herein in its entirety.

For the particular arrangement shown in FIG. 4, each discharge channel 152 intersects the respective cooling channel 130.

Figure 3:
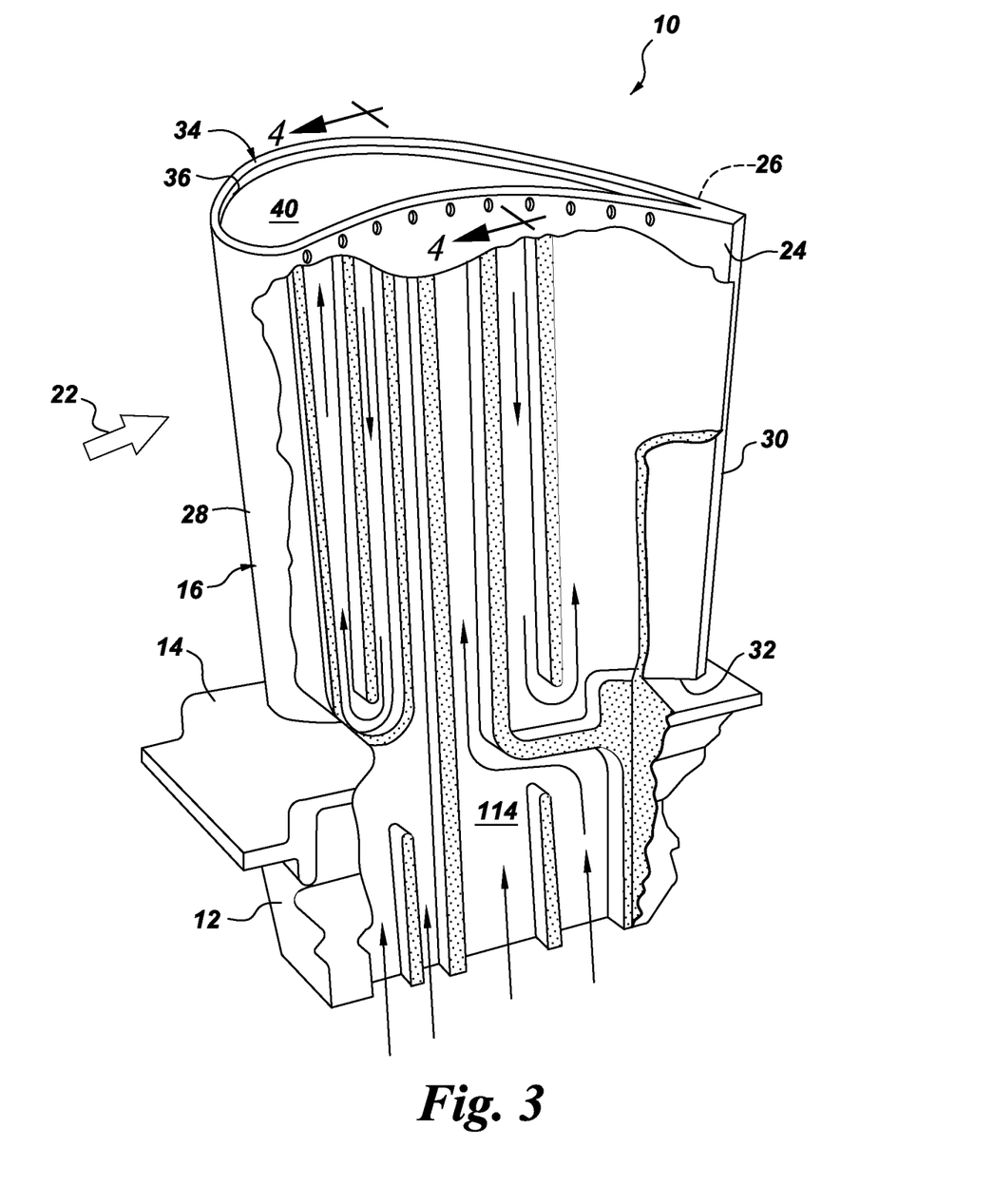
FIG. 3 is a partly sectional, isometric view of an example gas turbine rotor blade.

As indicated, for example in FIG. 3, for particular configurations, the substrate 110 defines a pressure sidewall 24 and a suction sidewall 26. The pressure and suction sidewalls 24, 26 are joined together at a leading edge 28 and at a trailing edge 30 of the component 100 and extend from a root 32 of the component to the tip 34 of the component 100. For the arrangement shown in FIG. 4, the cooling channels 130 extend at least partially along at least one of the pressure and suction sidewalls 24, 26. Beneficially, the cooling channels 130 cool the outer surface 112 of the substrate 110, as well as cooling the coating 150.

There are a number of possible arrangements for the cooling channels 130 and the discharge channels 152, depending on the design of the component tip. For the configuration shown in FIG. 5, each cooling channel 130 extends at least partially along the tip cap 40 and thus cools the tip cap 40. Still more particularly, for the arrangement shown in FIG. 5, the tip cap 40 defines at least one access channel 140 that extends between and provides fluid communication between at least one hollow, interior space 114 and at least one cooling channel 130, where the respective access channel 140 intersects the base 134 of the respective cooling channel 130.

As noted above, the grooves 132 may have a number of different geometries. For the arrangement shown in FIG. 6, each groove 132 has an opening 136, and each groove 132 narrows at the opening 136 of the groove 132 and thus comprises a re-entrant shaped 132, such that each cooling channel 130 comprises a re-entrant shaped cooling channel 130. Re-entrant shaped grooves are described in U.S. patent application Ser. No. 12/943,624. For particular configurations, the base 134 of a re-entrant shaped groove 132 is at least 2 times wider than the top 136 of the respective groove 132. For example, if the base 134 of the groove 132 is 0.75 millimeters, the top 136 would be less than 0.375 millimeters in width, for this configuration. For more particular configurations, the base 134 of the re-entrant shaped groove 132 is at least 3 times wider than the top 136 of the respective groove 132, and still more particularly, the base 134 of the re-entrant shaped groove 132 is in a range of about 3-4 times wider than the top 136 of the respective groove 132. Beneficially, a large base to top ratio increases the overall cooling volume for the micro-channel 130, while facilitating the deposition of the coating 150 over the groove 132 (without the use of a sacrificial filler) without having the coating 150 fill the groove 132.

For certain configurations, the structural coating 54 completely bridges the respective grooves 132, such that the coating 150 seals the respective micro-channels 130. For other configurations, however, the structural coating 54 defines one or more permeable slots 144 (for example, porosity in the coating or a gap in the coating), such that the structural coating does not completely bridge each of the one or more grooves 132, as indicated in FIG. 11. Although FIG. 11 schematically depicts the slots 144 as having a uniform and straight geometry, typically each slot 144 has an irregular geometry, with the width of the slot 144 varying, as the coating 150 is applied and builds up a thickness. Initially, as the first part of the coating 150 is applied to the substrate 110, the width of the slot 144 may be as much as 50% of the width of the top 136 of the micro-channel 130. The slot 144 may then narrow down to 5% or less of the width of the top 136, as the coating 150 is built up. For particular examples, the width of slot 144, at its narrowest point, is 5% to 20% of the width of the respective micro-channel top 136. In addition, the slot 144 may be porous, in which case the "porous" slot 144 may have some connections, that is some spots or localities that have zero gap. Beneficially, the slots 144 provide stress relief for the coating 150.

Beneficially, the micro-channels in the above-described cooling and discharge channel configurations provide a more definitive and efficient cooling of the tip, while the discharge channels serve to cool the tip rim, thereby retaining its durability and function.

Figure 7:
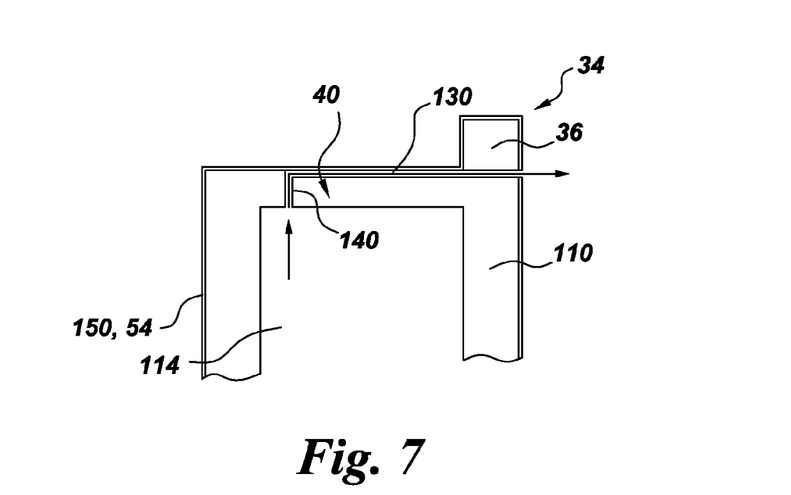
FIG. 7 is an elevational sectional view through an airfoil tip showing a micro-channel extending partially along a tip cap and in fluid communication with a respective access channel.

Another component 100 is described with reference to FIGS. 2, 3 and 5-11. As indicated for example in FIGS. 2 and 3, the component 100 includes a substrate 110 comprising an outer surface 112, an inner surface 116 and a tip 34. As indicated in FIG. 2, the inner surface 116 defines at least one hollow, interior space 114. As indicated, for example, in FIG. 7, the tip 34 comprises a tip cap 40 enclosing the hollow, interior space(s) 114. As indicated in FIGS. 6 and 7, for example, the outer surface 112 defines one or more grooves 132, where each groove 132 extends at least partially along an outer surface 112 of the tip cap 40 and has a base 134. The substrate 110 is described generally above, as is the general formation and geometries of the grooves.

As indicated, for example in FIGS. 2, 6 and 11, the component 100 further includes a coating 150 disposed over at least a portion of the outer surface 112 of the substrate 110. The coating 150 includes at least a structural coating 54 that extends over the groove(s) 132, such that the groove(s) 132 and the structural coating 54 together define one or more channels 130 for cooling the component 100. The coating is described above.

As indicated in FIGS. 5 and 7-10, for example, the tip 34 includes a tip cap 40 enclosing the hollow, interior space(s) 114, and the cooling channels 130 extend at least partially along the tip cap 40. Beneficially, by disposing the cooling channels 130 in the tip cap 40, micro-channel cooling can be provided to cool the tip cap during operation for improved durability and function.

For the example configurations shown in FIGS. 5 and 7-10, the tip cap 40 defines at least one access channel 140 that extends between and provides fluid communication between at least one hollow, interior space 114 and at least one cooling channel 130, wherein the respective access channel 140 intersects the base 134 of the respective cooling channel 130.

Techniques for forming access holes, as well as geometries for the access holes are described above.

Figure 8:
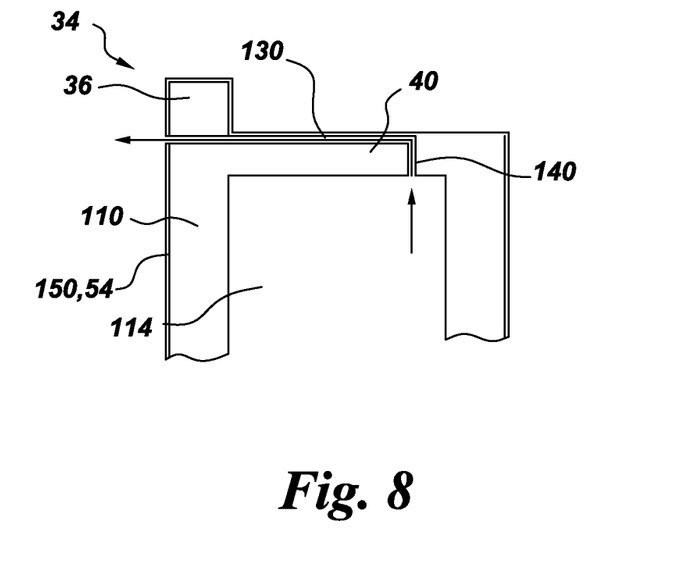
FIG. 8 is an elevational sectional view through an airfoil tip showing a micro-channel extending partially along a tip cap and in fluid communication with a respective access channel.
Figure 9:
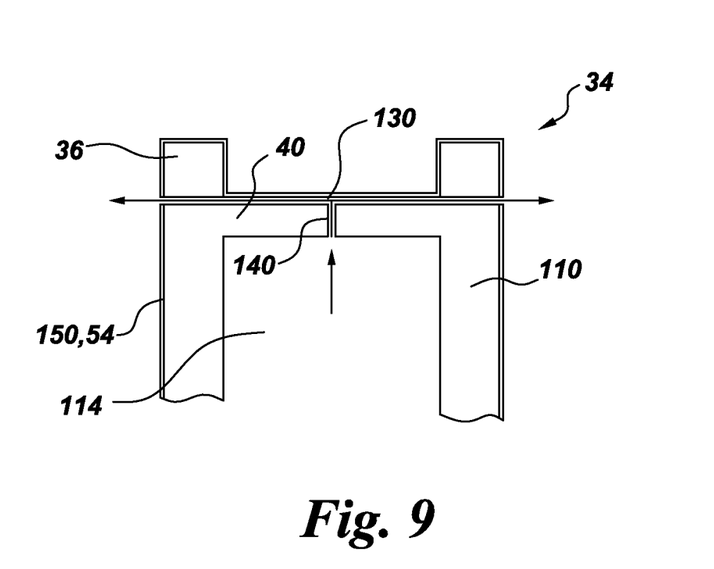
FIG. 9 is an elevational sectional view through an airfoil tip showing a micro-channel extending along a tip cap and in fluid communication with a respective access channel.
Figure 10:
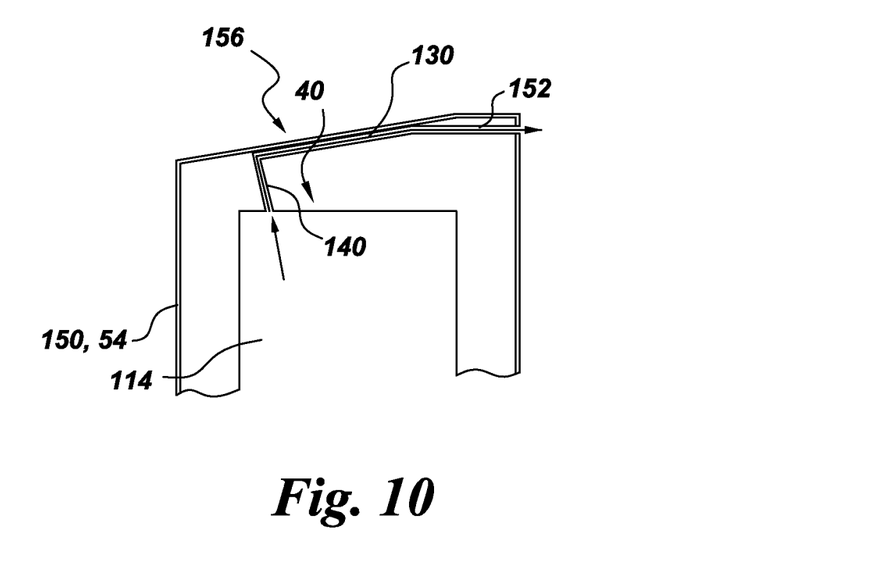
FIG. 10 is an elevational sectional view through an airfoil tip without a tip rim, showing a micro-channel extending partially along an angled tip cap and in fluid communication with respective access and discharge channels.

For the examples arrangements shown in FIGS. 7-9, the tip 34 further comprises a tip rim 36 disposed at a radially outer end 154 of the substrate 110. As indicated in FIGS. 7-9, the substrate 110 defines at least one discharge channel 152 that extends below the tip rim 36 and is in fluid communication with at least one cooling channel 130.

Similar to the configuration described above with reference to FIG. 3, for particular configurations, the substrate 110 defines a pressure sidewall 24 and a suction sidewall 26, where the pressure and suction sidewalls 24, 26 are joined together at a leading edge 28 and at a trailing edge 30 of the component 100 and extend from a root 32 of the component to the tip 34 of the component 100. For the particular configuration shown in FIG. 10, the tip cap 40 has a sloped radially outer end 156, and the tip cap 40 defines at least one discharge hole 152 that extends between a respective cooling channel 130 and one of the pressure or suction sidewalls 24, 26.

Similar to the configurations described above with reference to FIGS. 4 and 5, for the cooling configurations shown in FIGS. 5 and 7-10, the cooling channels may be re-entrant channels (described above with reference to FIG. 6). Similarly, for certain configurations, the structural coating may completely bridge each groove, thus sealing the channels. For other configurations, however, the structural coating 54 may define one or more permeable slots 144, such that the structural coating does not completely bridge each groove 132, as described above with reference to FIG. 11.

Figure 13:
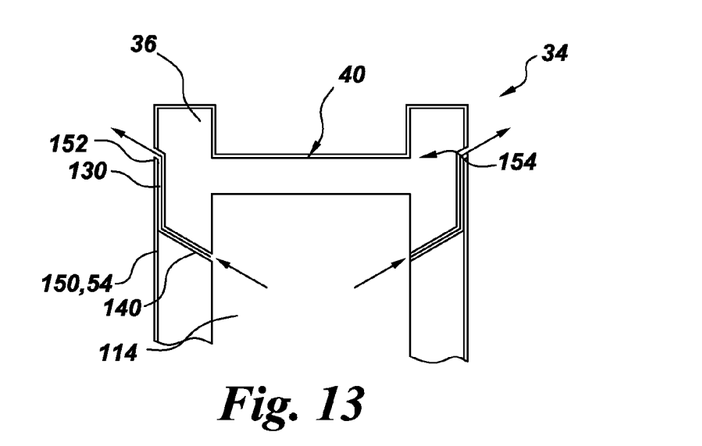
FIG. 13 is an elevational sectional view through an airfoil tip showing micro-channels extending partially along a tip rim.
Figure 14:
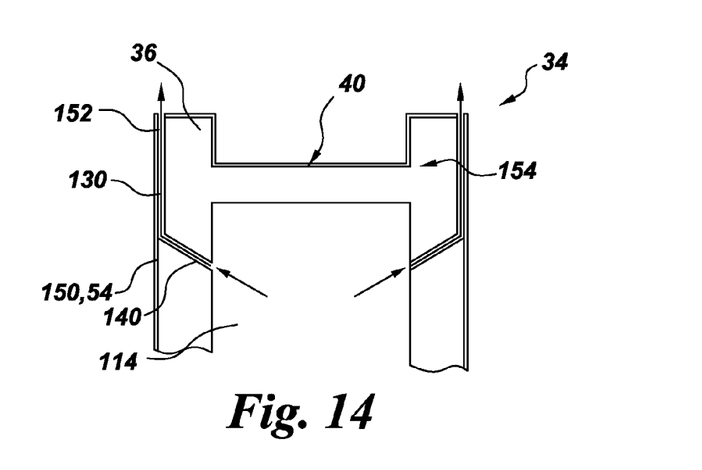
FIG. 14 is an elevational sectional view through an airfoil tip showing micro-channels extending along a tip rim.

Another component 100 is described with reference to FIGS. 2, 3, 6, 11, 13 and 14. As indicated, for example, in FIGS. 2 and 3, the component 100 includes a substrate 110 having an outer surface 112, an inner surface 116 and a tip 34. As indicated in FIG. 2, for example, the inner surface 116 defines at least one hollow, interior space 114. As indicated in FIGS. 6, 13 and 14, the outer surface 112 defines one or more grooves 132, where each groove 132 extends at least partially along the outer surface 112 of the substrate 110 and has a base 134. The substrate 110 is described generally above, as is the general formation and geometries of the grooves.

As indicated in FIGS. 2, 6, 13 and 14, the component 100 further includes a coating 150 disposed over at least a portion of the outer surface 112 of the substrate 110. The coating 150 includes at least a structural coating 54 that extends over the groove(s) 132, such that the groove(s) 132 and the structural coating 54 together define one or more channels 130 for cooling the component 100. The coating is described above.

As indicated in FIGS. 13 and 14, the tip 34 includes a tip cap 40 enclosing the hollow, interior space(s) 114, and a tip rim 36 disposed at a radially outer end 154 of the substrate. As indicated in FIGS. 13 and 14, each cooling channel 130 extends at least partially along the tip rim 36.

For the example configuration shown in FIG. 14, each cooling channel 130 extends along the length of the tip rim 36, whereas for the example configuration shown in FIG. 13, each cooling channel 130 extends only partially along the length of the tip rim 36.

As described above, the grooves 132 may have a number of different geometries. For the arrangements shown in FIGS. 6 and 11, the grooves are re-entrant shaped, such that each cooling channel 130 comprises a re-entrant shaped cooling channel 130. In addition, for certain configurations, the structural coating 54 completely bridges each groove and thus seals each groove 132. However, for the arrangement shown in FIG. 11, the structural coating 54 defines one or more permeable slots 144, such that the structural coating does not completely bridge each groove 132.

As described above, for particular configurations, the component comprises a turbine airfoil 100, and each hollow, interior space 114 comprises a respective segment of at least one flow channel 114. For the example configurations shown in FIGS. 13 and 14, the substrate 110 further defines at least one access channel 140 that extends between and provides fluid communication between a respective hollow, interior space 114 and at least one cooling channel 130, where the respective access channel 140 intersects the base 134 of the respective cooling channel 130. Various geometries for the access channels and techniques for forming the access channels are described above.

Another component 100 is described with reference to FIGS. 2, 3, 6, 11 and 12. As indicated, for example, in FIGS. 2 and 3, the component 100 includes a substrate 110 having an outer surface 112, an inner surface 116 and a tip 34. As indicated in FIG. 2, for example, the inner surface 116 defines at least one hollow, interior space 114. As indicated in FIGS. 6, 13 and 14, the outer surface 112 defines one or more grooves 132, where each groove 132 extends at least partially along the outer surface 112 of the substrate 110 and has a base 134. The substrate 110 is described generally above, as is the general formation and geometries of the grooves.

As indicated in FIGS. 2, 6, 13 and 14, the component 100 further includes a coating 150 disposed over at least a portion of the outer surface 112 of the substrate 110. The coating 150 includes at least a structural coating 54 that extends over the groove(s) 132, such that the groove(s) 132 and the structural coating 54 together define one or more channels 130 for cooling the component 100. The coating is described above.

Figure 12:
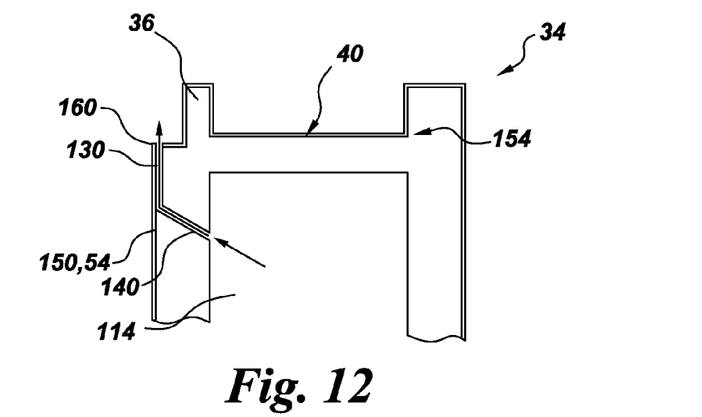
FIG. 12 is an elevational sectional view through an airfoil tip with a micro-channeled cooled tip shelf.

As indicated in FIG. 12, the tip 34 includes a tip cap 40 enclosing the hollow, interior space(s) 114, and a tip rim 36 disposed at a radially outer end 154 of the substrate and having a tip shelf 160. Similar to the configuration described above with reference to FIG. 3, the substrate 110 defines a pressure sidewall 24 and a suction sidewall 26. The pressure and suction sidewalls 24, 26 are joined together at a leading edge 28 and at a trailing edge 30 of the component 100 and extend from a root 32 of the component to the tip 34 of the component 100. For the arrangement shown in FIG. 12, at least one channel 130 extends at least partially along the pressure sidewall 24 and intersects the tip shelf 160. Other optional aspects of the component are described above.

It should be noted that although shown here in strictly two-dimensional cross sections through a blade tip, the cooling channels, discharge channels, and access channels can be curved or straight, may intersect each other, and can be three-dimensional along curved surfaces and through multiple sections. Further, although a primary purpose of the discharge or cooling channel penetrating the seal feature (tip rim, tip cap, etc.) is internal cooling, the exit of the channels can also act as film cooling on the external surface to further enhance to cooling of the seal feature.

Beneficially, the use of micro channels in the exterior surface provides a more definitive and efficient cooling of the tip, while the discharge channels serve to cool the aero sealing features (tip rim), thereby retaining their durability and function. Because of this more efficient blade tip cooling, current amounts of coolant dedicated to this purpose may be reduced significantly (for example, up to about fifty percent). In addition, the above-described tip cooling configurations help to retain the aero seal function of the blade tip, which leads to higher machine efficiency and power output. Similarly, for aviation applications, the above-described tip cooling configurations lead to better specific fuel consumption (SFC) and less degradation of exhaust gas temperature (EGT) margin.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A component comprising:
    a substrate comprising an outer surface, an inner surface and a tip, wherein the inner surface defines at least one hollow, interior space, wherein the tip comprises a tip cap enclosing the at least one hollow, interior space and a tip rim disposed at a radially outer end of the substrate, wherein the outer surface defines one or more grooves, and wherein each groove extends at least partially along the outer surface of the substrate and has a base; and
    a coating disposed over the tip cap, the tip rim and at least a portion of the outer surface of the substrate, wherein the coating comprises at least a structural coating bonded to the substrate during disposing, wherein the structural coating extends over the one or more grooves, such that the one or more grooves and the structural coating together define one or more channels for cooling the component,
    wherein the tip rim at least partially defines at least one discharge channel that is in fluid communication with at least one cooling channel.

2. The component of claim 1, wherein the component comprises a turbine airfoil, and wherein each hollow, interior space comprises a respective segment of at least one flow channel.

3. The component of claim 1, wherein the substrate further defines at least one access channel that extends between and provides fluid communication between a respective hollow, interior space and at least one cooling channel, wherein the respective access channel intersects the base of the respective cooling channel.

4. The component of claim 3, wherein each discharge channel intersects the respective cooling channel.

5. The component of claim 1, wherein the substrate defines a pressure sidewall and a suction sidewall, wherein the pressure and suction sidewalls are joined together at a leading edge and at a trailing edge of the component and extend from a root of the component to the tip of the component, wherein the channels extend at least partially along at least one of the pressure and suction sidewalls.

6. The component of claim 1, wherein each cooling channel extends at least partially along the tip cap.

7. The component of claim 6, wherein the tip cap defines at least one access channel that extends between and provides fluid communication between at least one hollow, interior space and at least one cooling channel, wherein the respective access channel intersects the base of the respective cooling channel.

8. The component of claim 1, wherein each groove has an opening, and wherein each groove narrows at the opening of the groove and thus comprises a re-entrant shaped groove, such that each cooling channel comprises a re-entrant shaped cooling channel.

9. The component of claim 1, wherein the structural coating defines one or more permeable slots, such that the structural coating does not completely bridge each groove.

10. The component of claim 1, wherein the structural coating seals each groove.

11. A component comprising:
    a substrate comprising an outer surface, an inner surface and a tip, wherein the inner surface defines at least one hollow, interior space, wherein the tip comprises a tip cap enclosing the at least one hollow, interior space and a tip rim disposed at a radially outer end of the substrate, wherein the outer surface defines one or more grooves, and wherein each groove extends at least partially along an outer surface of the tip cap and has a base; and
    a coating disposed over the tip rim, the tip cap and at least a portion of the outer surface of the substrate, wherein the coating comprises at least a structural coating bonded to the substrate during disposing, wherein the structural coating extends over the one or more grooves, such that the one or more grooves and the structural coating together define one or more channels for cooling the component,
    wherein each cooling channel extends at least partially along the tip cap.

12. The component of claim 11, wherein the tip cap defines at least one access channel that extends between and provides fluid communication between at least one hollow, interior space and at least one cooling channel, wherein the respective access channel intersects the base of the respective cooling channel.

13. The component of claim 12, wherein the substrate defines at least one discharge channel that extends below the tip rim and is in fluid communication with at least one cooling channel.

14. The component of claim 11, wherein the substrate defines a pressure sidewall and a suction sidewall, wherein the pressure and suction sidewalls are joined together at a leading edge and at a trailing edge of the component and extend from a root of the component to the tip of the component,
    wherein the tip cap has a sloped radially outer end, and wherein the tip cap defines at least one discharge hole that extends between a respective cooling channel and one of the pressure or suction sidewalls.

15. The component of claim 11, wherein each groove has an opening, and wherein each groove narrows at the opening of the groove and thus comprises a re-entrant shaped, such that each cooling channel comprises a re-entrant shaped cooling channel.

16. The component of claim 11, wherein the structural coating defines one or more permeable slots, such that the structural coating does not completely bridge each groove.

17. The component of claim 11, wherein the structural coating seals each groove.

18. A component comprising:
    a substrate comprising an outer surface, an inner surface and a tip, wherein the inner surface defines at least one hollow, interior space, wherein the tip defines a tip cap enclosing the at least one hollow, interior space and a tip rim disposed at a radially outer end of the substrate, wherein the outer surface defines one or more grooves, and wherein each groove extends at least partially along the outer surface of the substrate and has a base; and
    a coating disposed over the tip cap, the tip rim and at least a portion of the outer surface of the substrate, wherein the coating comprises at least a structural coating bonded to the substrate during disposing and comprises one of a nickel-based alloy or a cobalt-based alloy, wherein the structural coating extends over the one or more grooves, such that the one or more grooves and the structural coating together define one or more channels for cooling the component, wherein each cooling channel extends at least partially along the tip rim.

19. The component of claim 18, wherein each cooling channel extends along the length of the tip rim.

20. The component of claim 18, wherein each cooling channel extends only partially along the length of the tip rim.

21. The component of claim 18, wherein each groove has an opening, and wherein each groove narrows at the opening of the groove and thus comprises a re-entrant shaped groove, such that each cooling channel comprises a re-entrant shaped cooling channel.

22. The component of claim 18, wherein the structural coating defines one or more permeable slots, such that the structural coating does not completely bridge each groove.

23. The component of claim 18, wherein the structural coating seals each groove.

24. The component of claim 18, wherein the component comprises a turbine airfoil, and wherein each hollow, interior space comprises a respective segment of at least one flow channel.

25. The component of claim 18, wherein the substrate further defines at least one access channel that extends between and provides fluid communication between a respective hollow, interior space and at least one cooling channel, wherein the respective access channel intersects the base of the respective cooling channel.

26. A component comprising:
a substrate comprising an outer surface, an inner surface and a tip, wherein the inner surface defines at least one hollow, interior space, wherein the tip comprises tip cap enclosing the at least one hollow, interior space, and a tip rim disposed at a radially outer end of the substrate and having a tip shelf, and wherein the outer surface defines one or more grooves, and wherein each groove extends at least partially along the outer surface of the substrate and has a base; and
a coating disposed over the tip cap, the tip rim, the tip shelf and at least a portion of the outer surface of the substrate, wherein the coating comprises at least a structural coating bonded to the substrate during disposing and comprises one of a nickel-based alloy or a cobalt-based alloy, wherein the structural coating extends over the one or more grooves, such that the one or more grooves and the structural coating together define one or more channels for cooling the component,
wherein the substrate defines a pressure sidewall and a suction sidewall, wherein the pressure and suction sidewalls are joined together at a leading edge and at a trailing edge of the component and extend from a root of the component to the tip of the component, wherein at least one channel extends at least partially along the pressure sidewall and intersects the tip shelf.

27. The component of claim 26, wherein each groove has an opening, and wherein each groove narrows at the opening of the groove and thus comprises a re-entrant shaped, such that each cooling channel comprises a re-entrant shaped cooling channel.

28. The component of claim 26, wherein the structural coating defines one or more permeable slots, such that the structural coating does not completely bridge each groove.

29. The component of claim 26, wherein the structural coating seals each groove.

30. The component of claim 26, wherein the component comprises a turbine airfoil, and wherein each hollow, interior space comprises a respective segment of at least one flow channel.

31. The component of claim 26, wherein the substrate further defines at least one access channel that extends between and provides fluid communication between a respective hollow, interior space and at least one cooling channel, wherein the respective access channel intersects the base of the respective cooling channel.

* * * * *

UNITED STATES PATENT AND TRADEMARK OFFICE
CERTIFICATE OF CORRECTION

| | | |
|---|---|---|
| PATENT NO. | : 9,249,670 B2 | Page 1 of 1 |
| APPLICATION NO. | : 13/326540 | |
| DATED | : February 2, 2016 | |
| INVENTOR(S) | : Bunker | |

It is certified that error appears in the above-identified patent and that said Letters Patent is hereby corrected as shown below:

In the specification,
In Column 5, Line 3, delete "(miffing EDM), and laser machining" and insert -- (milling EDM), and laser machining. --, therefor.

Signed and Sealed this
Nineteenth Day of April, 2016

Michelle K. Lee
*Director of the United States Patent and Trademark Office*